Oct. 6, 1953     W. H. HARSTICK     2,654,595
VIBRATION INDICATING INSTRUMENT
Filed July 31, 1951
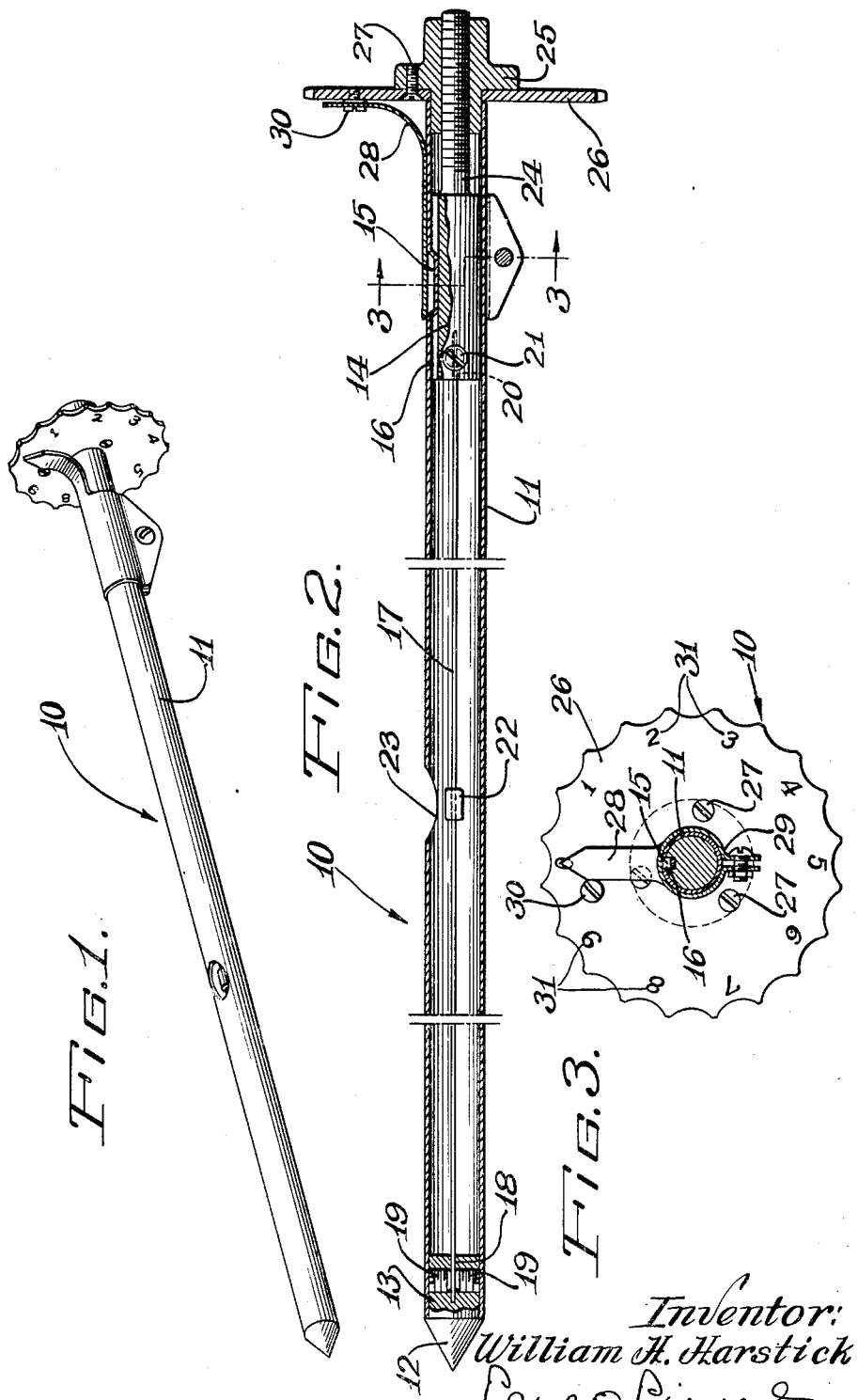
Inventor:
William H. Harstick
Paul O. Pippel
Atty.

Patented Oct. 6, 1953

2,654,595

UNITED STATES PATENT OFFICE 2,654,595

VIBRATION INDICATING INSTRUMENT

William H. Harstick, Oak Park, Ill., assignor to International Harvester Company, a corporation of New Jersey Application July 31, 1951, Serial No. 239,585

6 Claims. (Cl. 264—1)

This invention relates to a vibration indicator. More specifically this invention relates to an instrument for measuring the revolutions of a rotating shaft by the utilization of sympathetic vibrations introduced in the instrument during its contact with the supporting structure of a rotating shaft.

The basic principle utilized in this vibration indicator is shown in the H. Frahm Patent 759,512 patented May 10, 1904. Frahm, as exemplified in his patent, recognized the fact that flexible or elastic materials such as springs, wire, string, etc., would begin to oscillate and respond sympathetically in response to certain forces having certain intervals, the intervals corresponding to the period of oscillation of the material.

For instance, the force may be imparted by the oscillation or vibration which is set up in the surrounding structure which normally supports a rotating shaft. If the vibration or forces present in the shaft supporting structure are imparted to a piece of wire, the revolution of the shaft can be determined by finding out that length of the material in which the material has the largest oscillation. In other words, the wire or spring having a certain length will sympathetically vibrate and reach a maximum amplitude of vibration. Thus by previously determining the various lengths of the wire at which certain amplitudes of vibration are reached and by knowing the corresponding speed of rotation exemplified by such length, the instrument can be used to determine the R. P. M. of shafts by merely adjusting the length of the reed or wire until a maximum amplitude of vibration is reached.

Another patent which indicates the basic principle is the Kent et al. Patent 2,428,671, patented October 7, 1947. Frahm shows various modifications wherein the effective length of his reed is changed by the utilization of a clamping member which may be longitudinally adjusted with respect to the reed. Both in the Frahm and Kent references one of the ends of the reed may be left free and the other end may be stationarily positioned. By moving an adjustable clamping member longitudinally along the reed, the effective oscillation length of the reed is thus altered. By the effective length is meant the actual length of wire in which the oscillations or vibrations take place. The adjustable clamping members of Frahm and Kent are so arranged that they are intended to move along various points of the reed and clamp the same at a predetermined point. Difficulty has been experienced with constructions of this type in that a sliding contact on a vibrating member would in some cases be ineffectual since it is very difficult to dampen out vibrations beyond the effective length area of the wire unless a perfect contact is assured by the clamping member. It can readily be appreciated that unreliable recordings would be obtained if in effect the clamping member failed to function to completely dampen out vibrations beyond the effective length area of the wire. It is the prime object of this invention therefore to provide an improved vibrating instrument which eliminates the need for a sliding member movable longitudinally along the reed for dampening out vibrations and for varying the effective length of the reed.

A still further object is to provide a vibrating instrument having a stationary member and a movable member to which the ends of a vibrating element or wire are connected, the movable member being so arranged as to vary the tension within the wire, different tensions in said wire responding sympathetically to provide for maximum amplitudes of vibration in response to the vibration set up by a rotating shaft.

It is a further object to provide a vibrating instrument comprising a tubular body having a contact point, the tubular body including a longitudinally extending wire which is rigidly connected at one end to the body and is movably connected at its other end to an adjusting member, the tension of the wire being adjustable to various degrees of tension and being sympathetic to vibrations set up in structure upon placing the vibration in contact with said structure.

Still another object is to provide a vibration indicator having an elongated tubular body and enclosing a vibrating wire element, the wire element being adjustable by means of a rotatable member having indices thereon for indicating the tension in said wire element during a maximum amplitude of sympathetic vibration in said wire element.

These and further objects will become more readily apparent from a reading of the specification when examined in connection with the accompanying sheet of drawing.

In the drawing:

Figure 1 is a perspective view of the vibration indicating instrument.

Figure 2 is a diagrammatic view of the vibration indicating instrument shown mostly in section with the casing broken away.

Figure 3 is a section on line 3—3 of Figure 2.

A vibrating instrument is generally indicated by the reference character 10. The vibrating instrument 10 comprises an elongated tubular body 11 having at one end a closed pointed contact portion 12. Immediately adjacent the closed contact portion 12 is a stationary supporting block 13. The other end of the tubular body 11 is provided with a supporting block 14. The tubular body 11, as indicated at 15, is provided with a depressed portion which engages an elongated keyway 16 formed in the adjustable supporting block 14.

A vibrating reed or wire 17 has one end extending into a longitudinal bore 18 formed in the stationary block 13. A pair of opposed set screws 19 firmly engage and clamp the end of the wire 17 therebetween. It has been found that a thin spring-steel wire provides the best vibrating element but it must be understood, of course, that the invention is not limited to any particular shape of vibrating element or material. The other end of the wire 17 is disposed in a longitudinally extending bore 20 formed in the adjustable supporting block 14. A pair of opposed set screws 24, only one of which is shown, firmly engage and hold the end of the wire 17 in the longitudinal bore 20.

Intermediate the ends of the wire 17 a weight 22 is positioned. The weight 22 is disposed immediately beneath an opening 23 or observation window which is formed in the tubular body 11 for permitting visual observation of the weight and adjacent portions of the wire 17.

A screw 24 is formed integral with the adjustable supporting block 14, the screw 24 projecting outwardly from one end of the tubular body 11. A threaded member 25 engages the threads of the screw 24, the member 25 being firmly connected to a rotatable plate or knob 26 by means of a plurality of screws 27.

An indicating arrow 28 is firmly connected to one end of the tubular body 11 by means of a clamping sleeve 29. The knob 26 may be rotated relative to the arrow 28 and a stop 30 limits the clockwise and counterclockwise rotation. As indicated by the reference character 31, marking indicia, in this case numerals extending from 0 to 9, are present on the rotatable knob 26.

Previous to the initial use of the vibrating instrument 10, it has been determined that under certain tensions the wire element 17 will reach a maximum amplitude of vibration, this vibration being sympathetic when the contact point 12 is brought into engagement with a vibrating structure. The instrument will have been so calibrated that by turning the knob 26 to the indicia marking numeral 1, a certain tension will be created within the wire element 17, this tension being such that a shaft rotating, for example, at 1000 R. P. M. will cause sufficient vibrations or forces to provide maximum amplitude of vibration in the wire element. Thus whenever the instrument is held against a vibrating structure with the arrow at the numeral 1 and a maximum amplitude of vibration is reached, the operator can immediately determine that the shaft is rotating at 1000 R. P. M.

During the application of the instrument therefore, the contact point 12 is brought into engagement with any portion of the supporting structure of a rotating shaft. The knob 26 is thereupon turned from the point where the zero is in alignment with the arrow 28. Immediately upon turning of the knob 26, the tension in the wire 17 is increased. The knob 26 is turned further until visual observation of the weight 22 and the wire 17 indicates that a maximum amplitude of vibration has been reached. While the wire is made thin so that it can flex easily and would in itself be sufficient mass to give good amplitude response at high vibration frequencies, at lower frequencies it is desirable to have greater mass to attain sufficient build up of amplitude to be readily visible, and therefore the weight 22 is effective. It can then be said that enough weight has been applied to provide a mass that will respond to low frequencies and the wire, even though small as possible, is strong enough to permit an increase of tension sufficient to also respond to the higher frequencies. In other words, the range of the instrument has been increased. At this point the operator merely reads the numeral which is now opposite the arrow 28 and he can then quickly determine the speed of rotation of the shaft.

It thus can be seen that a very simplified vibration indicator has been provided, this indicator being particularly efficient in determining rotating shaft speeds. The indicator is particularly applicable to determine the speed of rotation of a cream separating bowl which may be enclosed in a housing or surrounding structure. The bowl which is rotated upon the drive shaft of an electric motor reaches extremely high speeds of operation and it is desirable in many cases to determine in the field the exact speed at which the bowl is rotating. By the utilization of this instrument the speed of rotation of the bowl can be quickly ascertained by merely applying the contact end of the instrument to the supporting or surrounding structure of the bowl.

The objects of the invention have been completely achieved. It can be seen that in applicant's novel construction both ends of the wire element 17 are firmly clamped and held at one end in a stationary block and at the other end in a longitudinally adjustable member. Generally speaking, the effective vibrating length of the wire element 17 remains the same and only the tension in the element is changed. This is unlike the above indicated references wherein the effective length of the reed is altered and an adjustable member is utilized for dampening out vibrations beyond the effective oscillating length of the wire.

It can now be seen that an improved vibrating instrument has been shown and described. It must be understood that various modifications and changes may be made which do not depart from the spirit of the invention as disclosed nor from the scope thereof as defined in the appended claims.

What is claimed is:

1. A vibration indicator comprising an elongated tube having at one end a contact point, an adjustable support positioned adjacent the opposite end of said tube for relative longitudinal sliding movement, a screw connected to said support, a rotatable member having a threaded portion in threaded engagement with said screw, a flexible wire element disposed within said tube, first means connecting one end of said wire element to the tube adjacent the first end, second means connecting the other end of said wire element to the adjustable support, a weight connected to the wire element substantially intermediate its ends, said tube including an opening adjacent the weight, said rotatable member being movable to move said adjustable support for varying the tension in said wire element, said contact end being adapted to engage the structure of a rotating shaft whereby sympathetic vibrations are occasioned in said wire element during a certain tension in said wire element, and a dial on said rotatable member, said dial including indices indicating the degree of tension of said wire element during a maximum amplitude of vibration of said wire element and said weight.

2. A vibration indicator comprising an elongated tube having at one end a contact point, an adjustable support slidably supported in said tube adjacent a second end, a screw on said adjustable support, a flexible wire element connected at one end to the first end of said tube, means connecting the opposite end of said wire element to said adjustable support, a weight supported on said wire intermediate its ends, an observation window in said tube adjacent said weight, and a rotatable element on said tube, said rotatable element having a portion in threaded engagement with the screw for varying the tension in said wire element, said wire element being sympathetic to the vibrations resulting from a rotating shaft whereby a maxium amplitude of vibration takes place in said wire and weight during a predetermined tension in said wire.

3. A vibration indicator comprising a tubular body having a portion thereof adapted to be placed into contact with the surrounding structure of a rotating shaft, an adjustable support longitudinally movable with respect to said body, a flexible wire element having one end connected adjacent one end of said body, means connecting the other end of said wire element to the adjustable support whereby said wire element is supported by its ends within the tubular body, an observation window in said tubular body providing for visual observation of at least a portion of said flexible wire element, and rotatable means for moving the adjustable support for varying the tension in said wire element, said wire element being sympathetic to the vibrations resulting from a rotating shaft whereby a maximum amplitude of vibration takes place in the wire during a predetermined tension in said wire.

4. A vibration indicator comprising a tubular body having a portion thereof adapted to be placed into contact with the surrounding structure of a rotating shaft, an adjustable support longitudinally movable with respect to said body, a flexible wire element having one end connected adjacent one end of said body, means connecting the other end of said wire element to the adjustable support whereby said wire element is supported by its ends within the tubular body, an observation window in said tubular body providing for visual observation of at least a portion of said wire element, rotatable means for moving the adjustable support for varying the tension in said wire element, said wire element being sympathetic to the vibrations resulting from a rotating shaft whereby a maximum amplitude of vibration takes place in the wire during a predetermined tension in said wire, and means on said rotatable means for indicating the tension in said wire during such maximum amplitude of vibration.

5. A vibration indicator comprising a tubular body, a contact point on one end of said body, a stationary support adjacent one end of said body, an adjustable support longitudinally slidable with respect to said body adjacent its other end, a flexible wire element having one end connected to said stationary support, means connecting the other end of said wire to said adjustable support whereby said wire element is suspended by its ends within said tubular body, said tubular body having an opening intermediate its ends providing for visual observation of said wire element, and means for longitudinally adjusting said adjustable support whereby the tension may be varied in said wire, said wire element being sympathetically responsive to the vibration resulting from a rotating shaft during contact of said contact point with the supporting structure of a shaft whereby a maximum amplitude of vibration takes place in the wire element during a predetermined tension in said wire element.

6. A vibration indicator comprising a tubular body having a portion thereof adapted to be placed into contact with the surrounding structure of a machine, a stationary support at one portion of said body, an adjustable support on said body longitudinally spaced with respect to said stationary support, a flexible wire-like element within said body, a first means connecting one end of said flexible element to said stationary support, a second means connecting the other end of said flexible element to said adjustable support whereby said flexible element is suspended by its ends within said body, said body including an observation window between the ends of said flexible element providing for visual observation of at least a portion of said flexible element, and means for adjusting said adjustable support relative to said stationary support whereby the tension may be varied in said flexible element, said flexible element being sympathetically responsive to the vibration of a machine which is in contact with the tubular body whereby a maximum amplitude of vibration takes place in said flexible element during a predetermined tension in said flexible element.

WILLIAM H. HARSTICK.

References Cited in the file of this patent

UNITED STATES PATENTS

| Number | Name | Date |
|---|---|---|
| 759,512 | Frahm | May 10, 1904 |
| 1,641,447 | McGall | Sept. 6, 1927 |
| 1,948,104 | Firestone | Feb. 20, 1934 |
| 2,313,893 | Rushing | Mar. 16, 1943 |
| 2,428,671 | Kent et al. | Oct. 7, 1947 |
| 2,514,153 | Dickerson | July 4, 1950 |